United States Patent
Walenty et al.

(10) Patent No.: US 6,728,621 B1
(45) Date of Patent: Apr. 27, 2004

(54) ANTI-LOCK BRAKING SYSTEM CONTROLLER FOR ADJUSTING SLIP THRESHOLDS ON INCLINES

(75) Inventors: Allen John Walenty, Macomb, MI (US); Kevin Gerard Leppek, Rochester Hills, MI (US); David Alan Thatcher, Troy, MI (US)

(73) Assignee: General Motors Corporation, Detroit, MI (US)

( * ) Notice: Subject to any disclaimer, the term of this patent is extended or adjusted under 35 U.S.C. 154(b) by 13 days.

(21) Appl. No.: 10/264,685

(22) Filed: Oct. 4, 2002

(51) Int. Cl.[7] .................. B60B 39/00; B60T 8/24; B60T 8/64; G05D 1/00
(52) U.S. Cl. ................. 701/71; 701/72; 701/73; 701/79; 701/80; 303/153; 303/155
(58) Field of Search ................. 701/71, 72, 73, 701/75, 76, 78, 79, 80; 303/153, 155

(56) References Cited

U.S. PATENT DOCUMENTS

| | | | | |
|---|---|---|---|---|
| 5,465,210 A | | 11/1995 | Walenty | ........ 364/424.05 |
| 5,646,848 A | * | 7/1997 | Walenty et al. | ........ 701/70 |
| 6,056,371 A | * | 5/2000 | Lin et al. | ........ 303/146 |
| 6,212,458 B1 | * | 4/2001 | Walenty et al. | ........ 701/51 |
| 6,405,117 B1 | | 6/2002 | Walenty et al. | ........ 701/70 |
| 6,498,976 B1 | * | 12/2002 | Ehlbeck et al. | ........ 701/70 |
| 6,553,304 B2 | * | 4/2003 | Walenty et al. | ........ 701/71 |
| 6,618,660 B2 | * | 9/2003 | Walenty et al. | ........ 701/71 |

\* cited by examiner

Primary Examiner—William A. Cuchlinski, Jr.
Assistant Examiner—Brian J. Broadhead
(74) Attorney, Agent, or Firm—Christopher DeVries

(57) ABSTRACT

A method and apparatus for operating a vehicle anti-lock braking system includes a brake pedal and a brake modulator that reduces braking pressure by an initial pressure reduction after detecting insipient wheel lock. Vehicle deceleration is measured as a function of brake pedal position. A first table is updated with the vehicle deceleration and the brake pedal position. A coefficient of friction of a road surface is estimated based on the first table. A slip target for at least one wheel is estimated and is based on an estimated maximum slip of the at least one wheel before losing traction minus an estimated potential for vehicle rollover. A deceleration target for at least one wheel is estimated and is based on an estimated maximum deceleration of the at least one wheel before losing traction minus the estimated potential for vehicle rollover.

20 Claims, 6 Drawing Sheets

ANTI-LOCK BRAKING SYSTEM CONTROLLER FOR ADJUSTING SLIP THRESHOLDS ON INCLINES

FIELD OF THE INVENTION

The present invention relates to braking systems for vehicles, and more particularly to antilock braking systems for vehicles.

BACKGROUND OF THE INVENTION

Stopping a car quickly on a slippery road is challenging task for drivers. Anti-lock braking systems (ABS) have significantly improved stopping distances on both dry and slippery roads. On slippery roads, even professional drivers cannot stop a vehicle as quickly without ABS as an average driver can with ABS. ABS rely on the fact that a skidding wheel (where the tire contact patch is sliding relative to the road) of a vehicle has less traction than a non-skidding wheel. By preventing the wheels from skidding while the vehicle slows down, ABS operation stops the vehicle faster and allow the vehicle to be steered during a panic stop.

Most ABS do not include costly brake pressure transducers, brake pedal force sensors, or attitude sensors. Conventional ABS include a "peak seeking" control method that slowly adjusts the wheel slip and wheel deceleration thresholds by applying rate controlled brake pressure increases. This peak seeking method may require several apply and release cycles to approach the correct slip and deceleration target thresholds. The adjustments made by these systems usually happen too slowly to adjust for inclines, turns, and/or vehicle loading.

Normal front to rear weight distribution of a front wheel drive (FWD) vehicle at rest is 60% front and 40% rear (60/40). Left to right balance is typically 50/50. Weight transfer due to braking at 0.9 g on a level surface in a straight line creates a front to rear weight distribution of 84/16. Weight transference due to a right turn at 0.3 g on a level surface at a steady speed creates a left to right weight distribution of 65/35. Pitch and roll angles of the road surface further complicate these dynamics.

Conventional ABS do not compensate for changes in the distribution of vehicle weight when braking or turning a corner. Conventional ABS also do not compensate for changes in weight distribution and traction when additional items are added to vehicle storage compartments. For example, the driver may load a trunk of a vehicle or a bed of a pickup truck with heavy items such as luggage or loads such as gravel. Alternately, an interior compartment of the vehicle may be filled with passengers and/or other heavy items. The failure to adequately compensate for the additional vehicle weight may cause instability during braking.

For example, when braking on a curve while traveling downhill, conventional ABS fail to optimize available traction to decelerate the vehicle as quickly as possible. Conventional ABS fail to account for changing steering angle and its impact on vehicle weight distribution and traction. A rear wheel located on an inner side of the downhill turn has dramatically reduced weight and traction. The front wheel on an outer side of the downhill turn has increased weight and traction. Vehicle control may be adversely impacted if too much brake torque is applied while engaging the brakes in a turn, particularly in a turn on a downgrade. Vehicle load is another factor that can dramatically impact ABS performance.

SUMMARY OF THE INVENTION

A method and apparatus according to the present invention for operating a vehicle anti-lock braking system includes a brake pedal and a brake modulator. The anti-lock braking system reduces braking pressure by an initial pressure reduction after detecting insipient wheel lock. Vehicle deceleration is measured as a function of brake pedal position. A first table is updated with the vehicle deceleration and the brake pedal position. A coefficient of friction of a road surface is estimated based on the first table. A slip target for a wheel is generated based on an estimated maximum slip of the wheel before losing traction minus an estimated potential for vehicle rollover.

In other features of the invention, a deceleration target for the wheel is generated based on an estimated maximum deceleration of the wheel before losing traction minus the estimated potential for vehicle rollover.

In still other features, rollover lateral acceleration is estimated. The estimated potential for vehicle rollover is based on the estimated rollover lateral acceleration. Grade is estimated based on rolling resistance, drag, engine braking, brake torque and acceleration. Vehicle weight, steering angle and steering rate are estimated.

In other features, weight distribution for the wheel is estimated. The weight distribution is adjusted for roll, pitch, and lateral and longitudinal acceleration. Brake release and apply torque for each of the wheels is calculated based on the coefficient of friction, attitude, and weight distribution.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

An ABS controller according to the present invention adjusts slip thresholds of wheels of the vehicle that are likely to cause instability on downhill turns. In particular, the slip thresholds are preferably set lower for the wheels that are likely to cause instability. The reduced slip thresholds and corresponding reduction in brake torque prevent vehicle spinout, rollover and/or other loss of control.

The ABS controller may be used with vehicles with smart brakes (electro-hydraulic, dry interface, VSES, TCS, etc.). In these systems, the brake torque is adjusted at each wheel of the vehicle to provide improved vehicle stability and control on hills. The ABS controller according to the present invention may also be used with transmission controllers to prevent a transmission downshift that may make the vehicle unstable. This additional feature is particularly useful on vehicles with rear wheel drive.

A coefficient of friction of the road surface (surface mu) can be calculated by establishing a relationship between pedal position and deceleration. For example, a table or formula may be trained during operation of the vehicle. Surface mu is also used to calculate brake heat, vehicle weight, and grade. A suitable method for calculating brake heat, vehicle weight and grade is disclosed in "Anti-Lock Brake Control Method Having Adaptive Initial Brake Pressure Reduction", U.S. Ser. No. 09/882,795, filed Jun. 18, 2001, which is hereby incorporated by reference. Roll and Pitch may be calculated using attitude sensors, using fluid reservoirs with level sensors, or in any other suitable manner.

Figure 1:
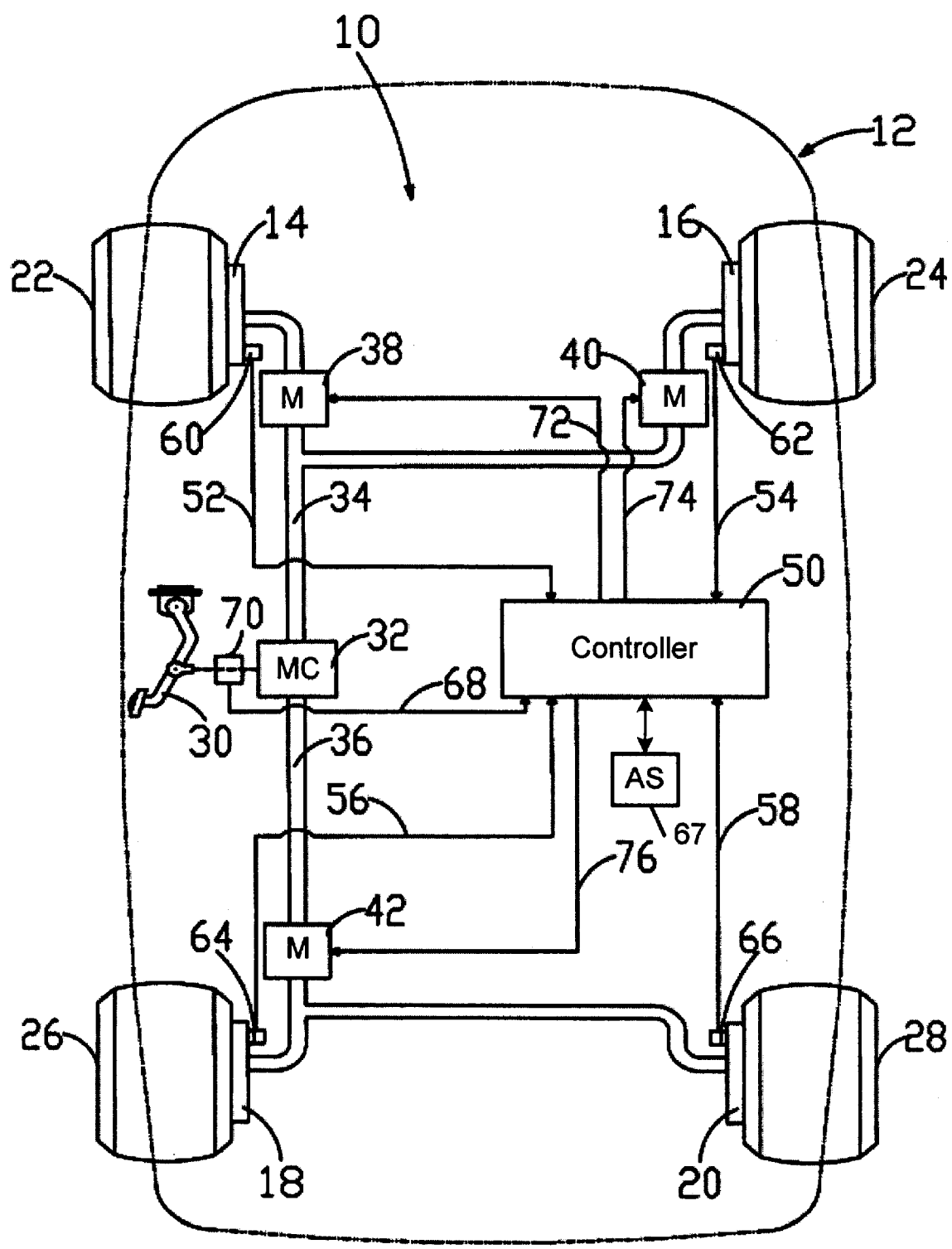
FIG. 1 is a functional block diagram of an anti-lock braking system according to the present invention.

Referring to FIG. 1, an anti-lock braking system (ABS) 10 is shown. A vehicle 12 includes hydraulically activated friction brakes 14, 16, 18, and 20 at vehicle wheels 22, 24, 26, and 28, respectively. A driver-actuated brake pedal 30 is mechanically and/or electrically coupled to a master cylinder (MC) 32 for producing hydraulic pressure in proportion to the force that is applied to the brake pedal 30.

The master cylinder 32, which may include a pneumatic booster (not shown), proportions the hydraulic pressure between front and rear brake supply lines 34 and 36 in a conventional manner. The front supply line 34 is coupled to the left front (LF) brake 14 by a LF anti-lock modulator (M) 38 and to the right front (RF) brake 16 by a RF anti-lock modulator (M) 40. The rear supply line 36 is coupled to the left and right rear wheel brakes 18 and 20 by a rear anti-lock modulator (M) 42.

An ABS controller 50 receives various inputs, including wheel speed signals on lines 52, 54, 56, and 58 from wheel speed sensors 60, 62, 64, and 66 respectively. An attitude sensor 67 provides roll and pitch signals. The ABS controller 50 receives a brake pedal position signal on line 68 from pedal position sensor 70. In response to the various inputs, the ABS controller 50 outputs modulator control signals on lines 72, 74, and 76 during wheel lock-up conditions. The ABS controller 50 may also output diagnostic information signals for display on a driver information device (not shown) associated with an instrument panel.

The ABS controller 50 preferably includes a processor, an input/output (I/O) interface, and memory such as read-only memory (ROM), random access memory (RAM), flash memory and/or other suitable electronic storage. The ABS controller 50 can also be implemented as an application specific integrated circuit (ASIC).

In general, the ABS controller 50 monitors the measured wheel speeds to detect a condition of insipient wheel lock. The controller 50 adjusts modulators 38, 40, and 42 to modulate the respective hydraulic brake pressures to maximize the tractive force between the vehicle tires and the road surface. When insipient wheel lock is detected, the modulators 38, 40, and 42 are activated to rapidly reduce the respective brake pressures to eliminate wheel slip. The amount of pressure reduction that is required to eliminate wheel slip varies with the coefficient of friction between the tires and the road surface. Conventional ABS controller 50 assume a low coefficient of friction such as glare ice since the actual coefficient of friction of the road surface is ordinarily unknown.

The reduction in brake pressure provided by the ABS controller 50 allows the wheels 22, 24, 26, and 28 to accelerate. The controller 50 measures the time that is required for the wheel acceleration to reach a reference acceleration value. Conventional ABS controllers estimate the coefficient of friction based on the measured time. The modulators 38, 40, and 42 are controlled to re-apply brake pressures based on the estimated coefficient(s) of friction.

The ABS controller 50 according to the present invention estimates the coefficient of friction between the tires and the road surface prior to the initial pressure reduction. For example, if the coefficient of friction is relatively high, the initial pressure reduction can be relatively small and the performance of the ABS is improved. Brake pressure can be rapidly re-applied once the wheel acceleration reaches the reference acceleration value. As a result, shorter stopping distances are produced.

The ABS controller 50 adaptively determines the coefficient of friction of the road surface. The ABS controller 50 determines the initial brake pressure reduction when insipient wheel lock occurs. The coefficient of friction is computed based on brake torque and vehicle weight. Brake torque and vehicle weight are adaptively determined based on a periodically updated table defining a relationship between brake pedal position and vehicle deceleration. The relationship is corrected for variations in brake heating.

Figure 2:
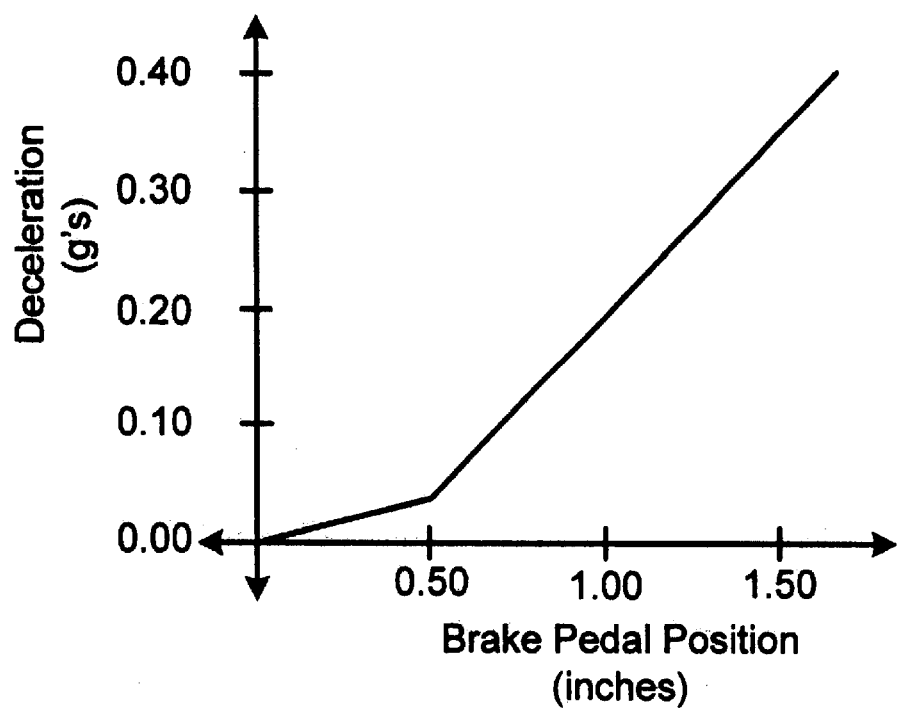
FIG. 2 is a graph showing deceleration as a function of brake pedal position.

FIG. 2 graphically depicts a representative relationship between vehicle deceleration and brake pedal position for braking of the vehicle 12. The relationship assumes that there is no lock-up condition and the modulators 38, 40, and 42 are inactive. Typically, a lower "knee" portion of the relationship varies considerably from stop to stop. The portion of the relationship above the knee portion tends to be linear and repeatable from stop to stop. For this reason, the lower knee portion of the relationship is preferably not used. The brake pedal position vs. vehicle deceleration relationship is preferably characterized for pedal positions and vehicle decelerations in the linear portion above the knee portion.

Figure 3:
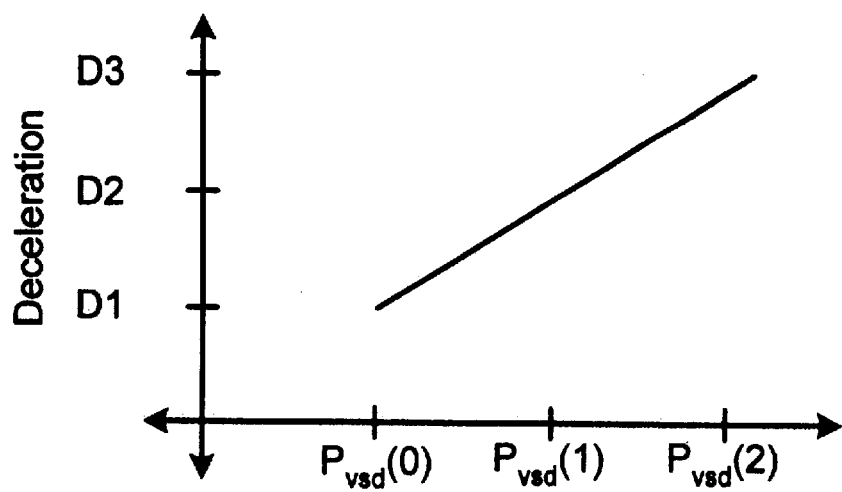
FIG. 3 is a graph showing deceleration as a function of three brake pedal positions.

Braking characterization data is collected by determining pedal positions that correspond to a plurality of different vehicle deceleration values. For example, in FIG. 3, deceleration values D1, D2 and D3 correspond to pedal position values $P_{vsd}(0)$, $P_{vsd}(1)$, and $P_{vsd}(2)$. The braking data is collected during braking operation when the pedal 30 is depressed at a "normal" rate or held in a static position for a predetermined period. Data is not collected while the brake pedal 30 is released or during panic braking. This eliminates the need to compensate for dynamic effects such as suspension, powertrain, tire and sensor dynamics. Additional details can be found in Walenty et al., U.S. Pat. No. 6,405,117, which is hereby incorporated by reference.

Surface mu is calculated using a current pedal position versus deceleration table. The following equations are preferably employed:

$$\text{Brake\_Heat} = \text{Brake\_Heat} - ((MPH + K_{coolspdmin})^2 * K_{coolspd}) * (\text{Brake\_Heat} - (\text{Brake\_Heat} * K_{coolambient}) + (\text{Brake Torque} * (K_{heat} * MPH)) * (K_{maxtemp} - \text{Brake\_Heat}) / K_{maxtemp}) \quad (1)$$

$$\text{Brake\_Torque} = ((\text{Pedal Position} - (P_{vsd}(0)) * ((P_{vsd}(2) - P_{vsd}(0)) / (D3 - D1))) * K_{brk\_torque} + ((\text{Update\_Brake\_heat} - \text{Brake\_heat}) * K_{heatcrv}) \quad (2)$$

$$\text{Vehicle\_Weight} = LVW + ((((P_{vsdold}(2) - (P_{vsdold}(0)) - ((P_{vsd}(2) - P_{vsd}(0)) / (D3 - D1))) * K_{vehweight}) + ((\text{Update\_Brake\_heat} - \text{Brake\_heat}) * K_{heatcrv}) \quad (3)$$

$$\text{Grade} = \text{Rolling Resistance} + \text{Aerodynamic Drag} + \text{Engine Braking} + \text{Brake Torque} + \text{Accel} \quad (4)$$

$$\text{Surface\_}Mu = (\text{Brake\_Torque}/\text{Vehicle\_Weight}) * K_{mu\_Lambda} \quad (5)$$

where variables starting with a K are stored and/or calculated values.

Before ABS becomes active, the coefficient of friction, grade, vehicle weight, steering angle, steering rate, lateral and longitudinal accelerations are calculated and sent to the ABS controller. There are many ways of determining steering angle. For example, $$\text{SteerAngle} = (LF_{speed} + LR_{speed}) - (RF_{speed} + RR_{speed}) * K_{stang\_spd}. \quad (6)$$

$K_{stang\_spd}$ is function that converts speed delta into steering angle. In U.S. Pat. No. 5,465,210, which is hereby incorporated by reference, a steering wheel position sensor and a method for determining a vehicle steering wheel center position are disclosed. In U.S. Pat. No. 5,465,210:

$$\text{SteerAngle} = (\text{Steer\_wheel\_center\_pos} - \text{Steer\_wheel\_pos}) * K_{stang\_pos}. \quad (7)$$

Steering wheel position is preferably an integer that ranges between 0 and 256. 0 corresponds to full left or right lock and 256 corresponds to full right or left lock. $K_{stang\_pos}$ is a function that converts position into steering angle. Still other methods of sensing and/or calculating steering angle are contemplated.

Once steering wheel position is determined, steering rate and lateral acceleration can be determined as follows:

$$\text{Steer Rate} = \frac{\text{ABS}(\text{Steer Angle} - \text{Old Steer Angle})}{\text{Time}} \quad (8)$$

$$\text{Lateral\_g} = \frac{(\text{Steer Angle} * \text{Vehicle Speed}) * K_{slat}}{\text{Time}} \quad (9)$$

where $K_{slat}$ converts angle and speed into lateral acceleration.

Weight distribution for each corner is calculated as a ratio. Where:

$$LFwt = \frac{LFwt}{LFwt + RFwt + LRwt + RRwt}. \quad (10)$$

Roll, pitch, and lateral and longitudinal acceleration change weight distribution at each corner as follows:

$$LFwt = LFwt + (K_{wt\_trLF}(\text{Roll}, \text{Pitch}) + \text{Lat\_g} + (1 - \text{Accel.}) + (\text{Steer Rate} * K_{st\_la})). \quad (12)$$

$K_{wt\_trLF}$ is preferably stored in a lookup table that provides the normal (calibratable) percentage of weight on the left front corner of the vehicle at various vehicle attitudes. $K_{wt\_trLF}$ is modified by weight transference due to acceleration. $K_{st\_la}$ is an anticipatory correction based on the steering rate to correct for tire scrub and actuator latency.

In one implementation of a smart brake system, the brake torque command is synonymous with a motor position of the brake actuator. The motor position vs. brake pedal position typically resides in a look-up table that is adjusted to optimize brake torque at each corner while on hills. Where:

$$LF_{mpos} = Lfi(bpos) * LFwt \quad (13)$$

When ABS becomes active, an accurate amount of release pressure may be calculated based upon the surface mu, attitude, weight transference, and steering angle. Where:

$$LF\_\text{Release\_}tq = K_{rel} * ((\text{Veh\_wt} * \text{surface } mu) * LFwt) \quad (14)$$

where $K_{rel}$ modifies the release target to slightly overshoot the release target on grades at which the tire(s) lose tractive cohesion with the road surface.

Target brake torque for each corner is modified by surface mu and weight distribution as follows. Where:

$$LF\_\text{Apply\_}tq = K_{app} * ((\text{Veh\_wt} * \text{surface\_}mu) * LFwt) \quad (15)$$

where $K_{app}$ modifies the apply target to slightly undershoot the real target on grades at which the tire(s) lose all tractive cohesion with the road surface.

Vehicle stability enhancement (VSES) or Traction Control (TCS) slip thresholds are set lower on wheels that are likely to cause instability on downhill turns. The lower application of brake torque helps prevent spinout and rollover. Vehicles equipped with smart brakes (electrohydraulic, dry interface, VSES, TCS, etc.) may use this invention to make brake torque adjustments at each corner to provide better vehicle stability control on hills.

Roll_Lat_g's is the lateral acceleration at which the vehicle will rollover at various vehicle attitudes and is calculated as follows:

$$\text{Roll Lat } g\text{'s} = ((g\_\text{height}^2 + (\text{track}/2)^2)^{0.5} * \cos(\sin(\text{Roll\_angle}) * \text{Pitch\_angle} + \tan^{-1}(cg\_\text{height}/\text{track})))/cg\_\text{height} \quad (16)$$

LF Slip Target is the maximum slip that a tire may support before losing tractive cohesion with the road surface minus the potential for vehicle rollover and is calculated as follows:

$$LF \text{ Slip Target} = ((\text{Max } LF \text{ Slip} * (1 - \text{surface } mu)) * LFwt) - (\text{Roll\_Lat\_g's} * K_{roll\_slip}). \quad (17)$$

$K_{roll\_slip}$ converts Roll_Lat_g's to wheel slip. LF Decel Target is the maximum deceleration that a tire may support before losing tractive cohesion with the road surface minus the potential for vehicle rollover.

$$LF \text{ Decel Target} = ((\text{Max } LF \text{ Decel} * 1 - \text{surface } mu) * LFwt) - \text{Roll\_Lat\_g's}. \quad (18)$$

Figure 4A:
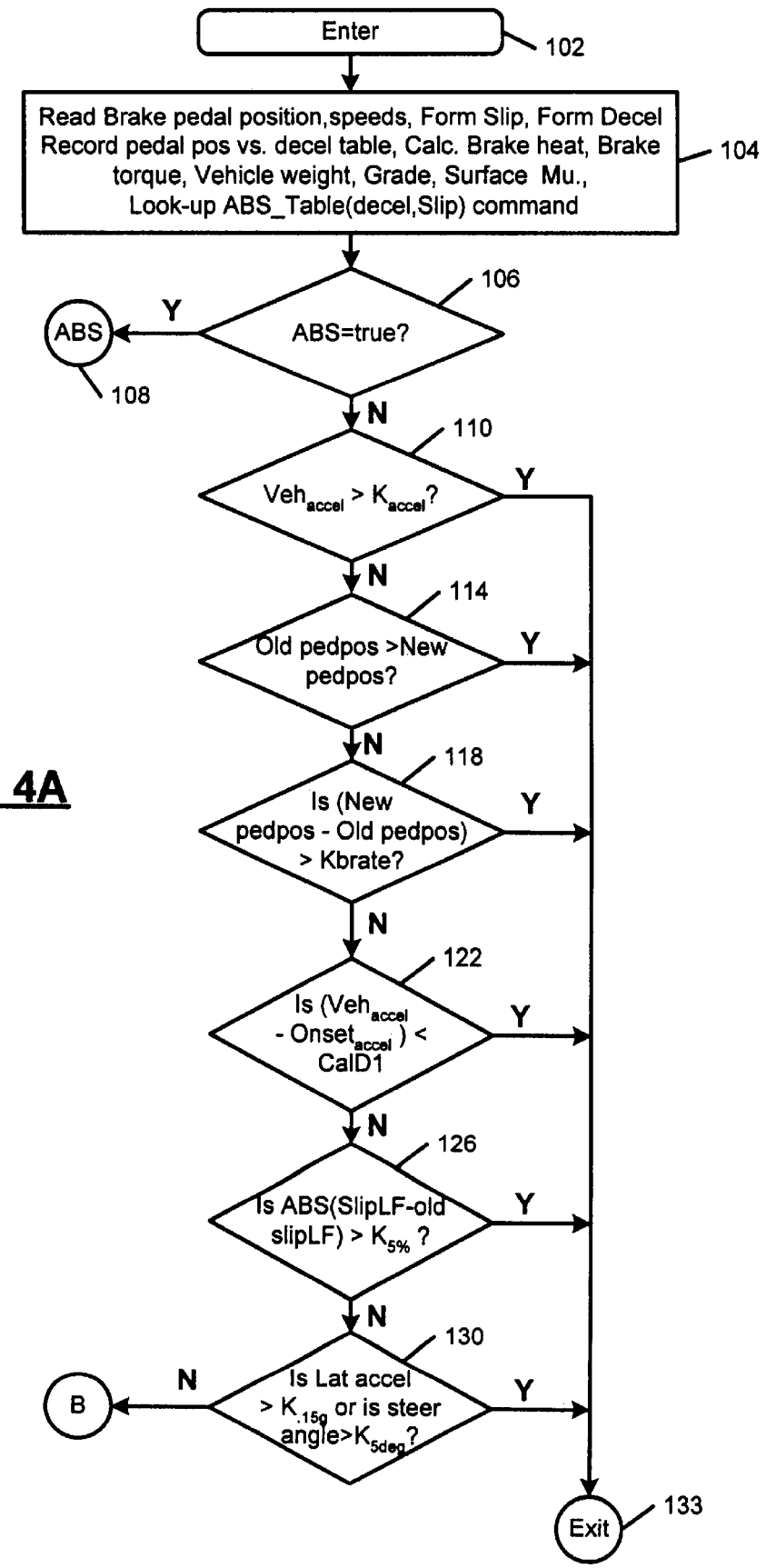
FIGS. 4A–4D are exemplary flowcharts illustrating steps performed by the anti-lock braking system controller to adjust slip thresholds according to the present invention.
Figure 4B:
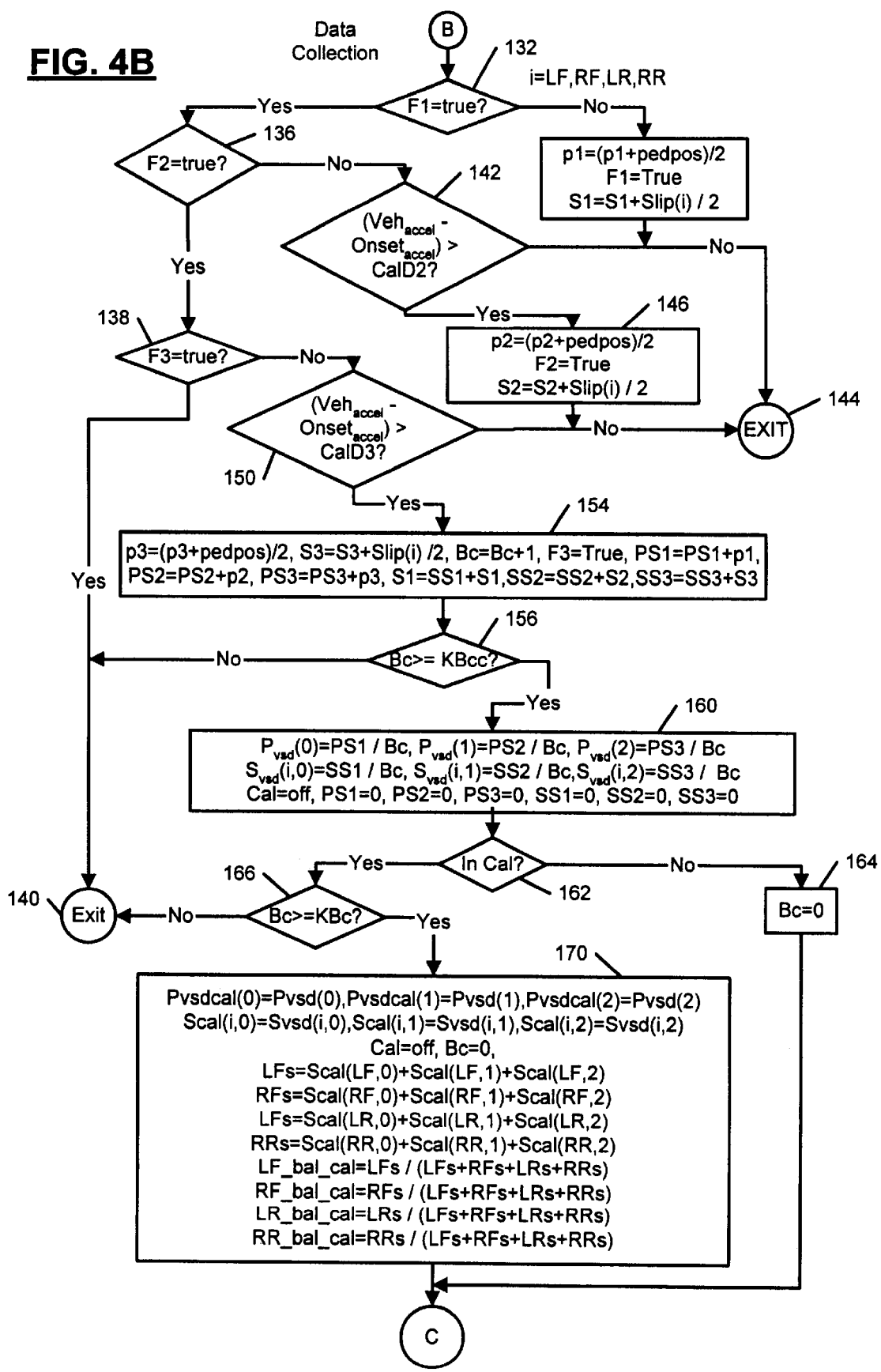
Figure 4C:
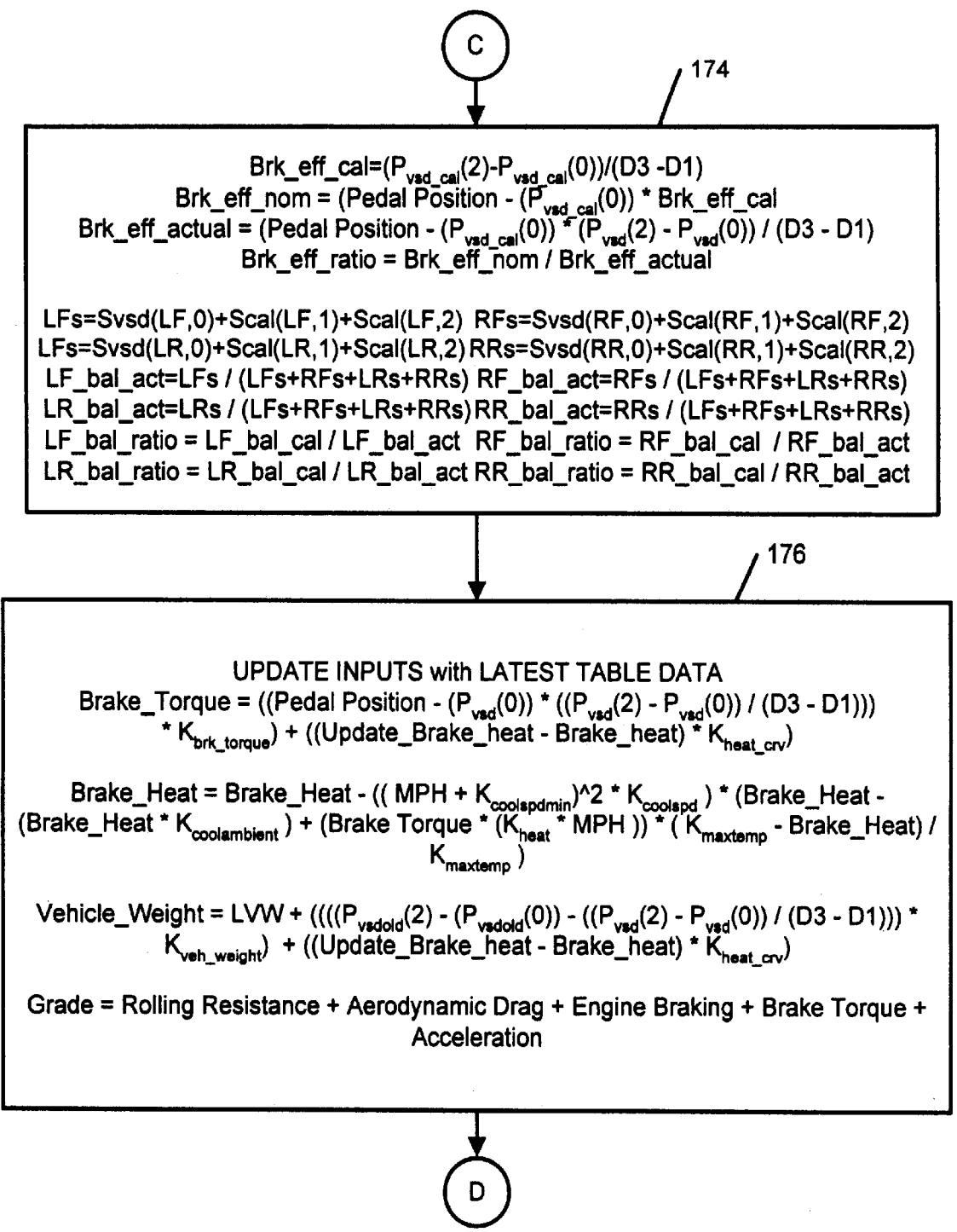
Figure 4D:
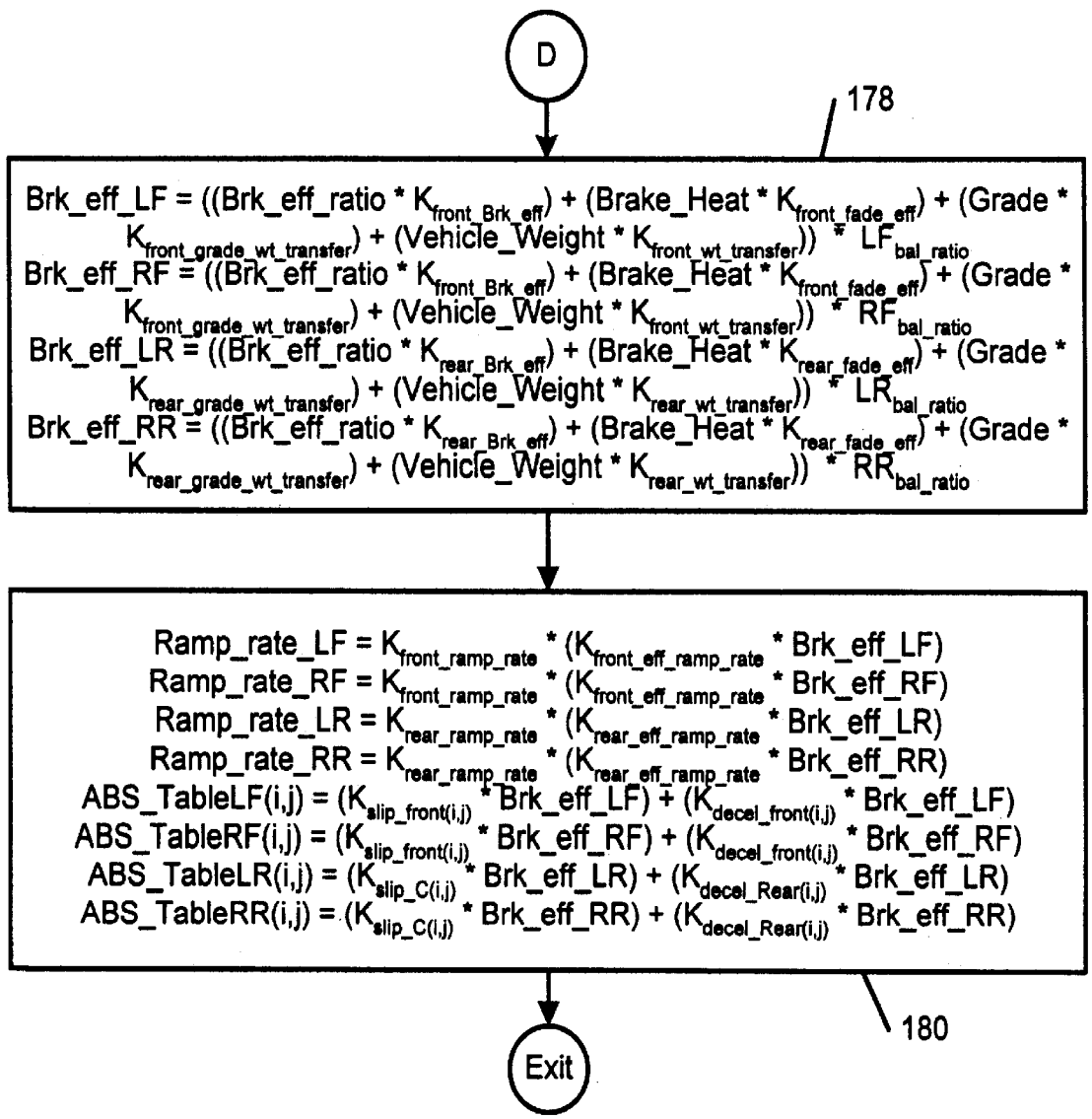

Referring to FIG. 4A, steps performed by the ABS controller 50 are shown in further detail. In step 102, control begins. In step 104, the ABS controller 50 reads brake pedal position, speeds, Form Slip, and Form Decel. The ABS controller 50 records a pedal position vs. deceleration table. The ABS controller 50 calculates brake heat, brake torque, vehicle weight, grade, and Surface Mu. The ABS controller 50 looks up the ABS_Table(decel,Slip) command.

Control continues from step 104 to step 106 where the ABS controller 50 determines whether ABS is equal to true. If true, the ABS controller 50 operates the ABS system as indicated at 108. If step 106 is false, control continues with step 110 where the ABS controller 50 determines whether $\text{Veh}_{accel} > K_{accel}$. If false, control continues with step 114 where the ABS controller 50 determines whether Old pedpos>New pedpos. If false, control continues with step 118 where the ABS controller 50 determines whether (New pedpos—Old pedpos)>$K_{brate}$. If false, control continues with step 122 where the ABS controller 50 determines whether $(\text{Veh}_{accel} - \text{Onset}_{accel}) < \text{CalD1}$.

If step 122 is false, control continues with step 126 where the ABS controller 50 determines whether ABS(SlipLF−oldslipLF)>$K_5$%. If step 126 is false, control continues with step 130 where the ABS controller 50 determines whether Lataccel>$K_{0.15\,g}$ or if steerangle>$K_{5\,deg}$. If step 130 is false, control continues with step 132. If any of the steps 110–130 are true, control ends at 133.

In step 132, control determines whether F1 is true. (Flags F1, F2, and F3 are set False when the brake is not applied.) If true, control continues with step 136 where the ABS controller 50 determines whether F2 is true. If step 136 is true, control determines whether F3 is true in step 138. If step 138 is true, control ends in step 140. If step 136 is false, control continues with step 142 where the ABS controller 50 determines whether (Veh$_{accel}$−Onset$_{accel}$)>CalD2. If false, control ends in step 144. If true, control continues with step 146 where the ABS controller 50 sets p2=(p2+pedpos)/2, F2=true, and S2=S2+Slip(i)/2. Control continues from step 146 to step 144.

If step 138 is false, control continues with step 150 where the ABS controller 50 determines whether (Veh$_{accel}$−Onset$_{accel}$)>CalD3. If false, control ends in step 144. If step 150 is true, control continues with step 154 where the ABS controller 50 performs the following calculations: p3=(p3+pedpos)/2, S3=S3+Slip(i)/2, Bc=Bc+1, F3=True, PS1=PS1+p1, PS2=PS2+p2, PS3=PS3+p3, S1=SS1+S1, SS2=SS2+S2, and SS3=SS3+S3. Control continues from step 154 to step 156 where the ABS controller 50 determines whether Bc>=KBcc. If false, control ends in step 140.

If step 156 is true, control continues with step 160 where the ABS controller 50 performs the following: P$_{vsd}$(0)=PS1/Bc, P$_{vsd}$(1)=PS2/Bc, P$_{vsd}$(2)=PS3/Bc, S$_{vsd}$(i,0)=SS1/Bc, S$_{vsd}$(i,1)=SS2/Bc, S$_{vsd}$(i,2)=SS3/Bc, Cal=off, PS1=0, PS2=0, PS3=0, SS1=0, SS2=0, and SS3=0.

Control continues from step 160 to step 162 to where the ABS controller determines whether the ABS system is in Cal. is false, control continues with step 164 and sets Bc=0. If step 162 is true, control continues with step 166 and determines whether Bc>=KBc. Is false, control ends in step 140. If step 166 is true, control continues with step 170 where the ABS controller 50 performs the following:

P$_{vsdcal}$(0)=P$_{vsd}$(0), P$_{vsdcal}$(1)=P$_{vsd}$(1), P$_{vsdcal}$(2)=P$_{vsd}$(2)

Scal(i,0)=S$_{vsd}$(i,0), Scal(i,1)=S$_{vsd}$(i,1), Scal(i,2)=S$_{vsd}$(i,2)

Cal=off, Bc=0,

LFs=Scal(LF,0)+Scal(LF,1)+Scal(LF,2)

RFs=Scal(RF,0)+Scal(RF,1)+Scal(RF,2)

LFs=Scal(LR,0)+Scal(LR,1)+Scal(LR,2)

RRs=Scal(RR,0)+Scal(RR,1)+Scal(RR,2)

LF_bal_cal=LFs/(LFs+RFs+LRs+RRs)

RF_bal_cal=RFs/(LFs+RFs+LRs+RRs)

LR_bal_cal=LRs/(LFs+RFs+LRs+RRs)

RR_bal_cal=RRs/(LFs+RFs+LRs+RRs)

Control continues from step 170 to step 174 where the controller 50 performs the following:

Brk_eff_cal=(P$_{vsd\_cal}$(2)−P$_{vsd\_cal}$(0))/(D3−D1)

Brk_eff_nom=(Pedal Position−(P$_{vsd\_cal}$(0))*Brk_eff_cal

Brk_eff_actual=(Pedal Position−(P$_{vsd\_cal}$(0))*(P$_{vsd}$(2)−P$_{vsd}$(0))/(D3−D1)

Brk_eff_ratio=Brk_eff_nom/Brk_eff_actual

LFs=Svsd(LF,0)+Scal(LF,1)+Scal(LF,2)

RFs=Svsd(RF,0)+Scal(RF,1)+Scal(RF,2)

LFs=Svsd(LR,0)+Scal(LR,1)+Scal(LR,2)

RRs=Svsd(RR,0)+Scal(RR,1)+Scal(RR,2)

LF_bal_act=LFs/(LFs+RFs+LRs+RRs)

RF_bal_act=RFs/(LFs+RFs+LRs+RRs)

LR_bal_act=LRs/(LFs+RFs+LRs+RRs)

RR_bal_act=RRs/(LFs+RFs+LRs+RRs)

LF_bal_ratio=LR_bal_cal/LF_bal_act

RF_bal_ratio=RF_bal_cal/RF_bal_act

LR_bal_ratio=LR_bal_cal/LR_bal_act

RR_bal_ratio=RR_bal_cal/RR_bal_act

Control continues from step 174 to step 176 where the ABS controller 50 performs the following:

UPDATE INPUTS with LATEST TABLE DATA

Brake_Torque=((Pedal Position−(P$_{vsd}$(0))*((P$_{vsd}$(2)−P$_{vsd}$(0))/(D3−D1)))*K$_{brk\_torque}$)+((Update_Brake_heat−Brake_heat)*K$_{heat\_crv}$) Brake_Heat=Brake_Heat−((MPH+K$_{coolspdmin}$)^2*K$_{coolspd}$)*(Brake_Heat−(Brake_Heat*K$_{coolambient}$)+(Brake Torque*(K$_{heat}$*MPH))*(K$_{maxtemp}$−Brake_Heat)/K$_{maxtemp}$)

Vehicle_Weight=LVW+((((P$_{vsdold}$(2)−(P$_{vsdold}$(0))−((P$_{vsd}$(2)−P$_{vsd}$(0))/(D3−D1)))*K$_{veh\_weight}$)+((Update_Brake_heat−Brake_heat)*K$_{heat\_crv}$)

Grade=Rolling Resistance+Aerodynamic Drag+Engine Braking+Brake Torque+Acceleration Control continues from step 176 to step 178 where the ABS controller 50 performs the following:

Brk_eff_LF=((Brk_eff_ratio*K$_{front\_Brk\_eff}$)+(Brake_Heat*K$_{front\_fade\_eff}$)+(Grade*K$_{front\_grade\_wt\_transfer}$)+(Vehicle_Weight*K$_{front\_wt\_transfer}$))*LF_bal_ratio Brk_eff_RF=((Brk_eff_ratio*K$_{front\_Brk\_eff}$)+(Brake_Heat*K$_{front\_fade\_eff}$)+(Grade*K$_{front\_grade\_wt\_transfer}$)+(Vehicle_Weight*K$_{front\_wt\_transfer}$))*RF_bal_ratio Brk_eff_LR=((Brk_eff_ratio*K$_{rear\_Brk\_eff}$)+(Brake_Heat*K$_{rear\_fade\_eff}$)+(Grade*K$_{rear\_grade\_wt\_transfer}$)+(Vehicle_Weight*K$_{rear\_wt\_transfer}$))*LR_bal_ratio Brk_eff_RR=((Brk_eff_ratio*K$_{rear\_Brk\_eff}$)+(Brake_Heat*K$_{rear\_fade\_eff}$)+(Grade*K$_{rear\_grade\_wt\_transfer}$)+(Vehicle_Weight*K$_{rear\_wt\_transfer}$))*RR_bal_ratio Control continues from step 176 to step 178 where the ABS controller 50 performs the following:

Ramp_rate_LF=K$_{front\_ramp\_rate}$*(K$_{front\_eff\_ramp\_rate*Brk\_eff\_LF}$)

Ramp_rate_RF=K$_{front\_ramp\_rate}$*(K$_{front\_eff\_ramp\_rate*Brk\_eff\_RF}$)

Ramp_rate_LR=K$_{rear\_ramp\_rate}$*(K$_{rear\_eff\_ramp\_rate*Brk\_eff\_LR}$)

Ramp_rate_RR=K$_{rear\_ramp\_rate}$*(K$_{rear\_eff\_ramp\_rate*Brk\_eff\_RR}$)

ABS_TableLF(i,j)=(K$_{slip\_front(i,j)}$*Brk_eff_LF)+(K$_{decel\_front(i,j)}$*Brk_eff_LF)

ABS_TableRF(i,j)=(K$_{slip\_front(i,j)}$*Brk_eff_RF)+(K$_{decel\_front(i,j)}$*Brk_eff_RF)

ABS_TableLR(i,j)=(K$_{slip\_C(i,j)}$*Brk_eff_LR)+(K$_{decel\_Rear(i,j)}$*Brk_eff_LR)

ABS_TableRR(i,j)=(K$_{slip\_C(i,j)}$*Brk_eff_RR)+(K$_{decel\_Rear(i,j)}$*Brk_eff_RR)

The ABS controller may also be used in vehicles with electronic transmission control to prevent a transmission downshift to first or second gear that would make the vehicle unstable, which is useful in rear wheel drive vehicles. The ABS controller provides a more effective way of identifying the actual coefficient of friction for each corner when engaging the brakes while turning on steep hills, which allows the proper calculation of release and apply pressures and slip and decel targets.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method of operating a vehicle anti-lock braking system including a brake pedal and a brake modulator that reduces braking pressure by a initial pressure reduction after detecting insipient wheel lock, comprising:

measuring vehicle deceleration as a function of brake pedal position;

updating a first table with said vehicle deceleration and said brake pedal position;

estimating a coefficient of friction of a road surface based on said first table; and estimating a slip target for at least one wheel that is based on an estimated maximum slip of said at least one wheel before losing traction minus an estimated potential for vehicle rollover.

2. The method of claim 1 further comprising estimating a deceleration target for at least one wheel that is based on an estimated maximum deceleration of said at least one wheel before losing traction minus said estimated potential for vehicle rollover.

3. The method of claim 2 further comprising estimating rollover lateral acceleration and wherein said estimated potential for vehicle rollover is based on said estimated rollover lateral acceleration.

4. The method of claim 2 further comprising estimating grade based on rolling resistance, drag, engine braking, brake torque and acceleration.

5. The method of claim 3 further comprising estimating vehicle weight.

6. The method of claim 5 further comprising estimating steering angle and steering rate.

7. The method of claim 6 further comprising estimating weight distribution for each wheel of said vehicle.

8. The method of claim 7 further comprising adjusting said weight distribution for roll, pitch, lateral acceleration and longitudinal acceleration.

9. The method of claim 8 further comprising calculating brake release torque for each of said wheels based on said coefficient of friction, attitude, and weight transference.

10. The method of claim 9 further comprising calculating brake apply torque based on said coefficient of friction, said attitude, and said weight transference.

11. A vehicle anti-lock braking system, comprising:

a brake pedal;

a brake modulator; and a controller that communicates with said brake modulator and that measures vehicle deceleration as a function of brake pedal position, updates a first table with said vehicle deceleration and said brake pedal position, estimates a coefficient of friction of a road surface based on said first table, and estimates a slip target for at least one wheel that is based on an estimated maximum slip of said at least one wheel before losing traction minus an estimated potential for vehicle rollover.

12. The method of claim 11 wherein said controller estimates a deceleration target for at least one wheel that is based on an estimated maximum deceleration of said at least one wheel before losing traction minus said estimated potential for vehicle rollover.

13. The method of claim 12 wherein said controller estimates rollover lateral acceleration and wherein said estimated potential for vehicle rollover is based on rollover lateral acceleration.

14. The method of claim 12 wherein said controller estimates grade based on rolling resistance, drag, engine braking, brake torque and acceleration.

15. The method of claim 13 wherein said controller estimates vehicle weight.

16. The method of claim 15 wherein said controller estimates steering angle and steering rate.

17. The method of claim 16 wherein said controller estimates weight distribution for each wheel of said vehicle.

18. The method of claim 17 wherein said controller adjusts said weight distribution for roll, pitch, lateral acceleration and longitudinal acceleration.

19. The method of claim 18 wherein said controller calculates brake release torque for each of said wheels based on said coefficient of friction, attitude, and weight transference.

20. The method of claim 19 wherein said controller calculates brake apply torque based on said coefficient of friction, said attitude, and said weight transference.

* * * * *